United States Patent
Emmitte, Jr.

[11] Patent Number: 5,880,358
[45] Date of Patent: Mar. 9, 1999

[54] METHOD AND APPARATUS FOR PRESSURE TESTING VALVES

[76] Inventor: John P. Emmitte, Jr., 8418 Scranton, Houston, Tex. 77061

[21] Appl. No.: 659,757

[22] Filed: Jun. 6, 1996

Related U.S. Application Data

[63] Continuation of Ser. No. 177,447, Jan. 5, 1994, Pat. No. 5,528,926.

[51] Int. Cl.[6] .................................................... G01M 3/00
[52] U.S. Cl. ................................................ 73/49.8; 73/46
[58] Field of Search .......................... 73/46, 49.1, 49.3, 73/49.4, 49.5, 49.6, 49.8; 138/89, 90

[56] References Cited

U.S. PATENT DOCUMENTS

| | | | |
|---|---|---|---|
| 3,088,312 | 5/1963 | Morris | 73/46 |
| 4,520,655 | 6/1985 | Owens | 73/46 |
| 4,813,456 | 3/1989 | Emmittee, Jr. | 138/90 |
| 5,528,926 | 6/1996 | Emmitte, Jr. | 73/49.8 |

OTHER PUBLICATIONS

"Model 1500" Advertising Brochure, Calder Testers, Inc.
"Model 600 Series" Advertising Brochure, Calder Testers, Inc., Mar. 31, 1994.

*Primary Examiner*—Ronald Biegel
*Attorney, Agent, or Firm*—Tobor & Goldstein, L.L.P.

[57] ABSTRACT

A method and apparatus for pressure testing valves utilizes a seal plate having a mounting plate disposed on one of its ends and a sealing surface on its other end, and a mounting plate cradle is provided for releaseably securing the mounting plate to a cradle support plate, whereby the seal plate may be readily installed within a valve testing machine without the necessity of screwing or bolting the seal plate within the valve testing machine.

20 Claims, 5 Drawing Sheets

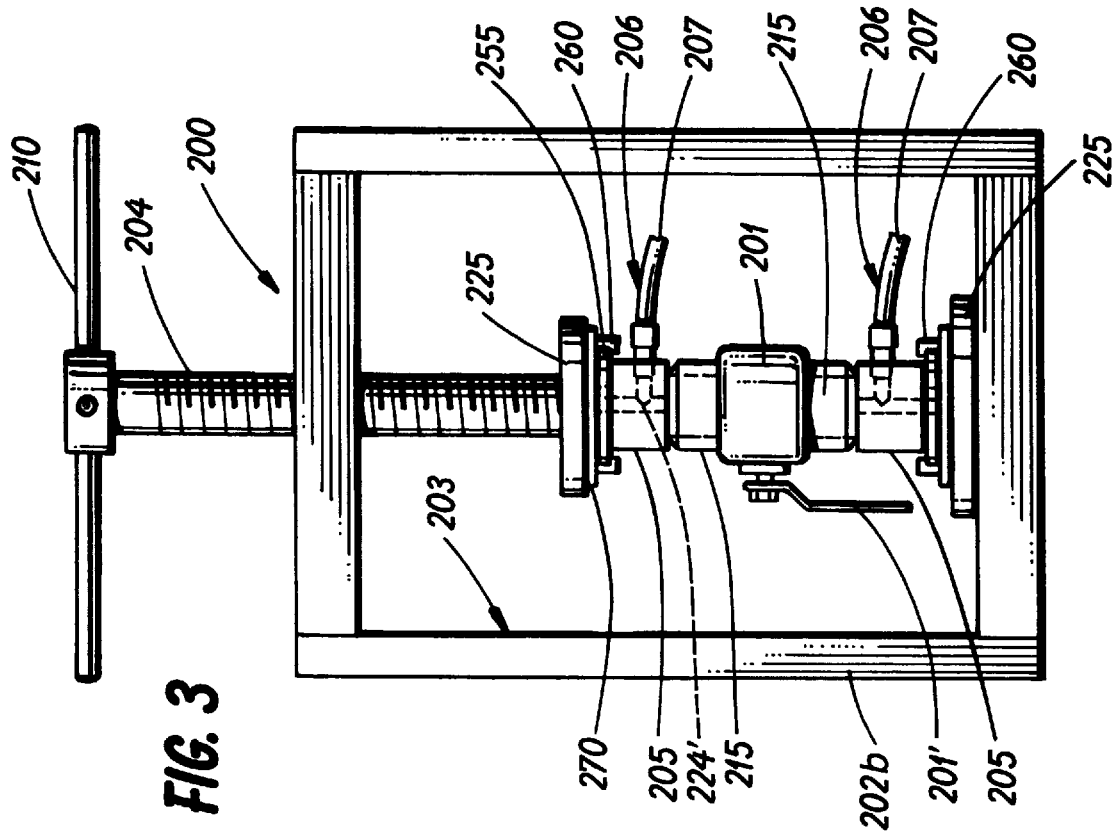
FIG. 3
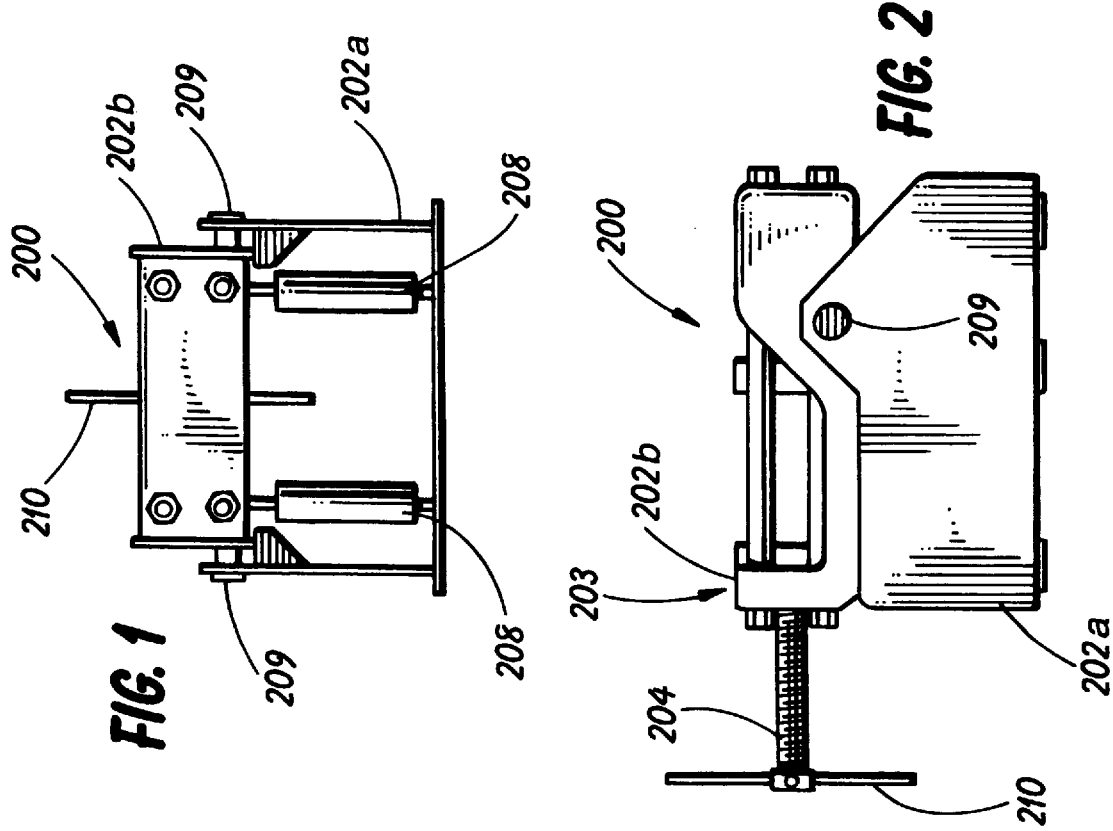
FIG. 1
FIG. 2

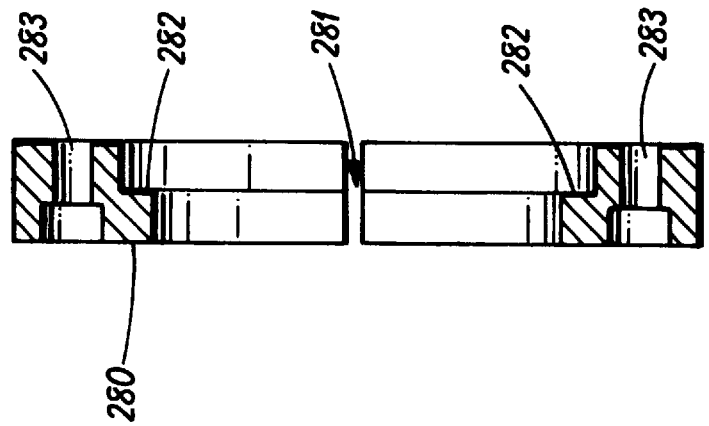
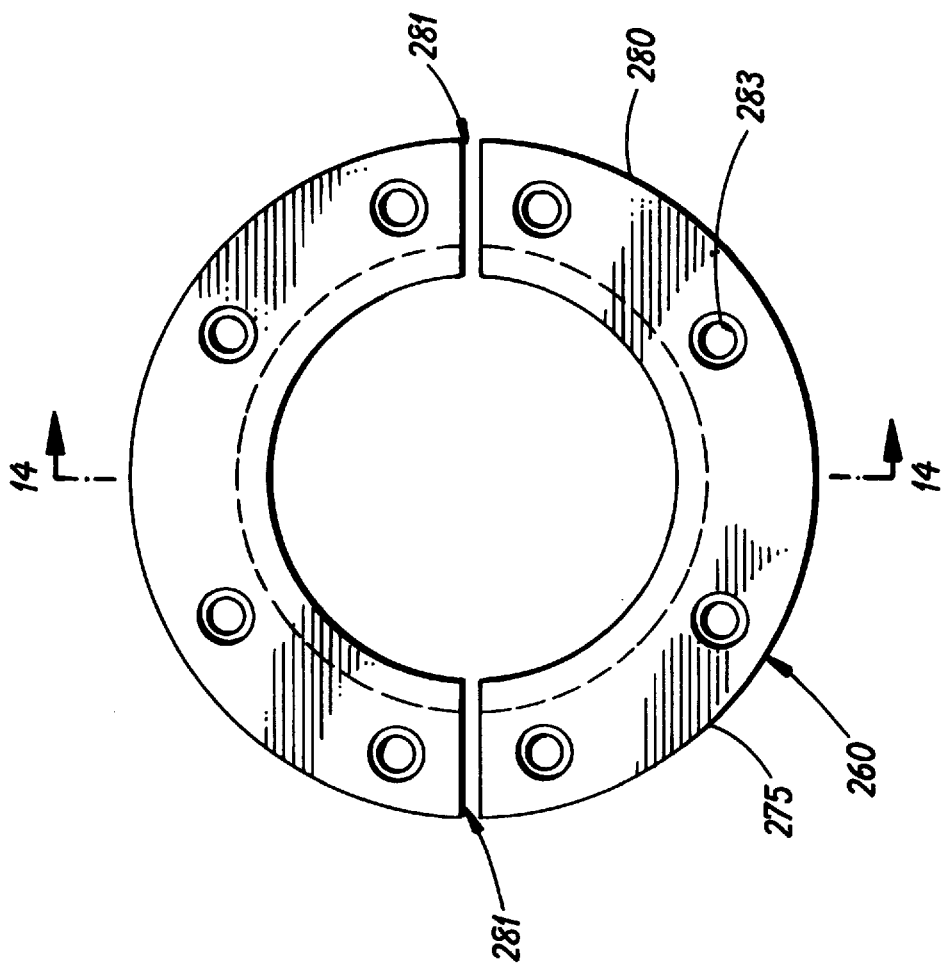

METHOD AND APPARATUS FOR PRESSURE TESTING VALVES

This is a continuation, of application Ser. No. 08/177,447, filed Jan. 5, 1994, now U.S. Pat. No. 5,528,926.

BACKGROUND OF THE INVENTION

1. Field of The Invention

The invention relates to a method and apparatus for pressure testing of valves, pipe, or fittings.

2. Description of the Prior Art

Valve testing machines have been utilized for pressure testing of valves and other types of products, such as pipe or fittings, wherein a pressurized fluid, such as air or water, is pumped into the valve, pipe, or fitting, to pressurize the interior of the valve, pipe, or fitting. Such valve testing machines typically require the valve, or other product, to be tested, to be clamped within the valve testing machine, and the opening, or openings, of the valve, pipe, or fitting, is sealed, whereby the interior of the valve, or other product, may be pressurized as desired. Typically, a seal head for each end of the valve, or other product, which has an opening, is fixedly secured within the valve testing machine, as by the use of screws, nuts, bolts, or similar equipment, which requires the valve testing machine operator to tighten the screws, nuts and/or bolts with screwdrivers or wrenches, or similar equipment. The valves, and other products to be pressure tested, can have a variety of different types of end configurations, such as flanged, buttwelded, socket welded, female threaded, or any other type of end configuration found on a valve, type, or other type of fitting. Each time a different valve, or a valve having a different end configuration, is to be tested on the valve testing machine, it is necessary to remove the seal head, previously fixedly secured within the valve testing machine, and to install a different seal head, which may have either a different construction, or is sized differently, from the seal head previously installed within the valve testing machine. Removing the previous seal head, and installing another seal head, is a time consuming, labor intensive operation, which is inefficient because of the necessity of loosening previously tightened nuts, bolts, and/or screws, and then retightening such nuts, bolts, and/or screws for the next seal head utilized in the valve testing machine.

Accordingly, prior to the development of the present invention, there has been no method and apparatus for pressure testing of valves, and other products, which: are simple and economical to manufacture; are efficient and economical to use; and do not require the use of nuts, bolts, and/or screws, to fixedly secure a seal head within a valve testing machine. Therefore, the art has sought a method and apparatus for pressure testing of valves, and other products, which: are simple and economical to manufacture; are easily and efficiently used; and do not require; nuts, bolts, and/or screws to fixedly secure a seal head within a valve testing machine.

SUMMARY OF THE INVENTION

In accordance with the invention, the foregoing advantages have been achieved through the present seal head for sealing an opening of a valve to permit pressure testing of a valve by a valve testing machine having a force transmitting member adapted to force the seal head into sealing engagement with the opening of the valve. The present invention includes: a seal plate having first and second ends, with a sealing surface disposed on the first end for sealing the opening of the valve, and a mounting plate disposed on the second end, the sealing surface including a fluid passageway in communication with the opening of the valve and adapted for communication with a supply of pressurized fluid; and a mounting plate cradle for releaseably securing the mounting plate to a cradle support plate, the cradle support plate being adapted to receive a force from the force transmitting member, whereby the seal plate may be readily installed within the valve testing machine without the necessity of screwing or bolting the seal plate within the valve testing machine.

Another feature of the present invention is that the cradle support plate may include a fluid passageway which is in fluid communication with the fluid passageway of the sealing surface when the mounting plate is releaseably secured to the cradle support plate by the mounting plate cradle. An additional feature of the present invention is that the mounting plate cradle may be a lip member extending outwardly from the cradle support plate, and the cradle support plate may have a lower end, and the lip member is disposed about the lower end of the cradle support plate, and the lip member defines a receptacle for receipt of at least a portion of the mounting plate.

A further feature of the present invention is that the sealing surface may include at least one O-ring seal disposed upon the seal plate, or the sealing surface may be a layer of a plastic material disposed upon the first end of the seal plate.

In accordance with another aspect of the present invention, the foregoing advantages have also been achieved through the present valve testing machine for pressure testing of a valve having at least one opening. This aspect of the present invention includes: a frame; means for mounting the valve to be pressure tested within the frame; at least one seal plate having first and second ends, with a sealing surface disposed on the first end for sealing the at least one opening of the valve, and a mounting plate disposed on the second end, the sealing surface including a fluid passageway in communication with the at least one opening of the valve, the fluid passageway being disposed in fluid communication with a supply of pressurized fluid; a force transmitting member, associated with the frame for forcing the at least one seal plate into sealing engagement with the at least one opening of the valve; and a mounting plate cradle for releaseably securing the mounting plate of the at least one seal head to a cradle support plate, the cradle support plate being operatively associated with the force transmitting member, whereby the at least one seal plate may be readily installed within the frame without the necessity of screwing or bolting the at least one seal plate within the frame.

In accordance with another aspect of the present invention, the foregoing advantages have been achieved through the present method for pressure testing, in a valve testing machine, at least one valve having at least one opening. This aspect of the present invention includes the steps of: releaseably securing at least one first seal plate of at least one first seal head within the valve testing machine, without screwing or bolting the first seal plate within the valve testing machine; disposing a first valve in the valve testing machine; sealing the at least one opening of the first valve with a sealing surface disposed on the at least one first seal plate; and pressure testing the first valve by pumping pressurized fluid into the valve through the at least one opening in the valve.

A further feature of this aspect of the present invention may include the steps of: disposing a second valve in the valve testing machine; releaseably securing at least one second seal plate of at least one second seal head within the valve testing machine, without screwing or bolting the second seal plate within the valve testing machine; sealing the at least one opening of the second valve with a sealing surface disposed on the at least one second seal plate; and pressure testing the second valve by pumping pressurized fluid into the valve through the at least one opening in the valve.

An additional feature of this aspect of the present invention may include the steps of utilizing first and second seal plates having different constructions from each other, or utilizing first and second seal plates which have different sizes from each other. Another feature of the present invention is that the at least one seal plate of the at least one seal head may be releaseably secured within the valve testing machine by disposing a portion of the at least one seal head within a cradle member of the valve testing machine.

The method and apparatus for pressure testing valves, and other products, of the present invention, when compared with previously proposed prior art, methods and apparatus, have the advantages of being efficient and economical to manufacture and use, are not labor-intensive, and do not require the use of nuts, bolts, and/or screws, to fixedly secure a seal head within a valve testing machine.

BRIEF DESCRIPTION OF THE DRAWINGS

In the drawings:

FIG. 1 is an end view of a valve testing machine in accordance with the present invention;

FIG. 2 is a side view of the valve testing machine of FIG. 1;

FIG. 3 is a top view of the valve testing machine of FIGS. 1 and 2;

FIG. 13 is a front view of a machined ring, from which two mounting plate cradles in accordance with the present invention may be manufactured; and FIG. 14 is a partial cross-sectional view taken along lines 14—14 of FIG. 13.

Figure 4:
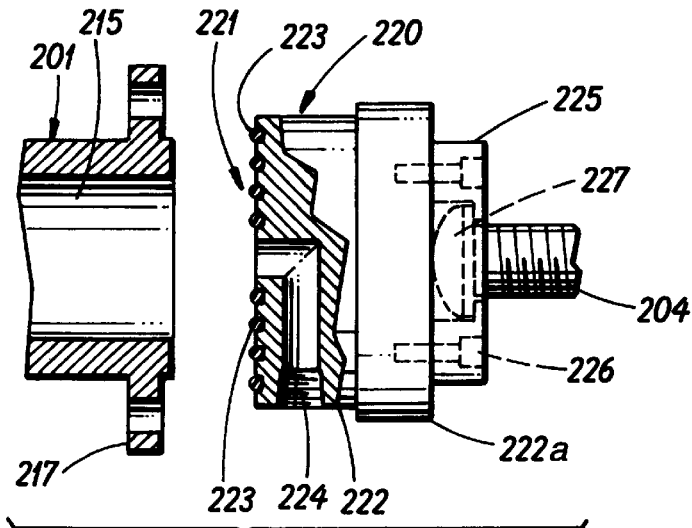
FIGS. 4–7 are partial cross-sectional views of prior art seal heads which are used with different types of valve end configurations, a portion of a different type of valve end configuration being illustrated in each figure.

While the invention will be described in connection with the preferred embodiment, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

In FIGS. 1–3, a valve testing machine 200, in accordance with the present invention, for pressure testing a valve 201 (FIG. 3), generally includes a frame 202a, 202b; means for mounting 203 the valve 201 within the frame 202b; a force transmitting member, or lead screw, 204, associated with the frame 202b; at least one seal plate 205 (FIG. 3); and a supply, or source, 206 of pressurized fluid, or pressurized fluid supply line 207. The details of construction of seal plate 205 will be hereinafter described in greater detail in connection with FIGS. 8–12. If desired, valve testing machine 200 may be provided with a plurality of hydraulic cylinders 208 which are operable upon frame 202b to tilt it upwardly about shafts 209. As shown in FIG. 3, upon rotation of lead screw 204, as by turning handle 210, valve 201 is clamped between seal plates 205, and valve 201 may be subsequently pressure tested by the passage of pressurized fluid through pressurized fluid supply hoses 207 which may pass through seal plates 205 and into an opening 215 of valve 201. Alternatively, force transmitting member, 204, may be a hydraulic ram which is associated with the frame 202b, which forces at least one seal plate 205 into sealing engagement with the opening 215 of valve 201, as is conventional in the art. The valve testing machine of FIGS. 1–3 preferably includes two seal plates 205, both seal plates 205 being urged into a sealing relationship with the openings 215 of valve 201 by operation of the force transmitting member 204, or lead screw.

With reference to FIGS. 4–7, four end configurations of valves 201 are illustrated in combination with prior art seal heads for use with a valve testing machine not manufactured in accordance with the present invention. In FIG. 4, the portion of valve 201 is illustrated having a flanged end configuration, including a flange 217 disposed about opening 215 of valve 201. Prior art seal head 220 includes a sealing surface 221 formed on a rigid seal plate 222, and sealing surface 221 may be comprised of a plurality of O-ring seals 223 which seal against flange 217 of valve 201. A fluid passageway 224 is provided in seal plate 222, which is adapted for being in fluid communication with a supply of pressurized fluid, such as pressurized fluid supply hose 207 shown in FIG. 3. A secondary seal plate 222a is illustrated, which in turn is fixedly secured to an abutment retainer member 225, as by a plurality of bolts 226. An abutment member 227 is disposed upon the end of force transmitting member, or lead screw, 204. Seal plate 222 may either be formed integrally with secondary seal plate 222a, or seal plate 222 may be rigidly and fixedly secured to secondary seal plate 222a, as by welding, or by screws or bolts (not shown). An example of a prior art seal head 220 as illustrated in FIG. 4, may be found in U.S. Pat. No. 4,813,456, which patent is incorporated herein by reference.

Figure 5:
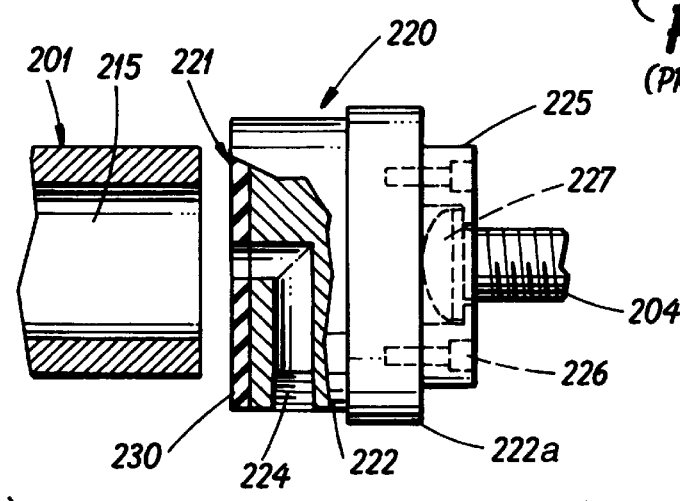
Figure 6:
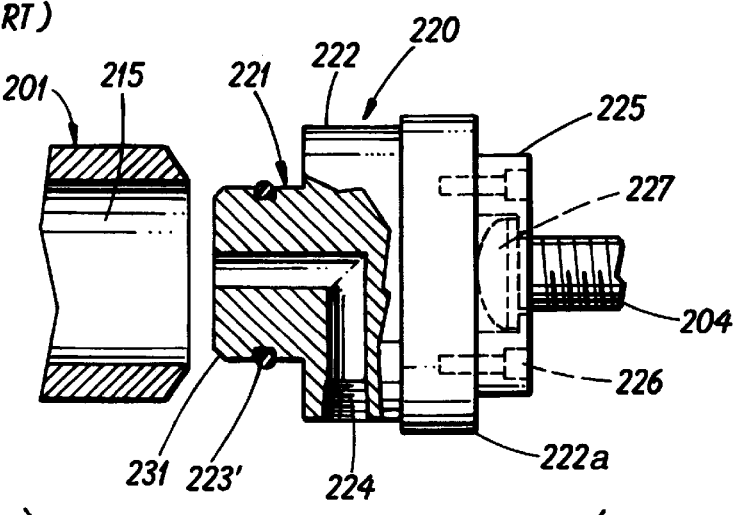
Figure 7:
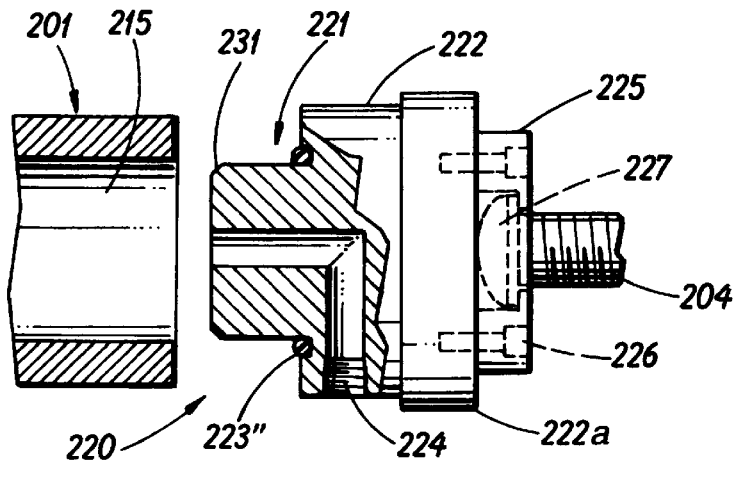
Figure 8:
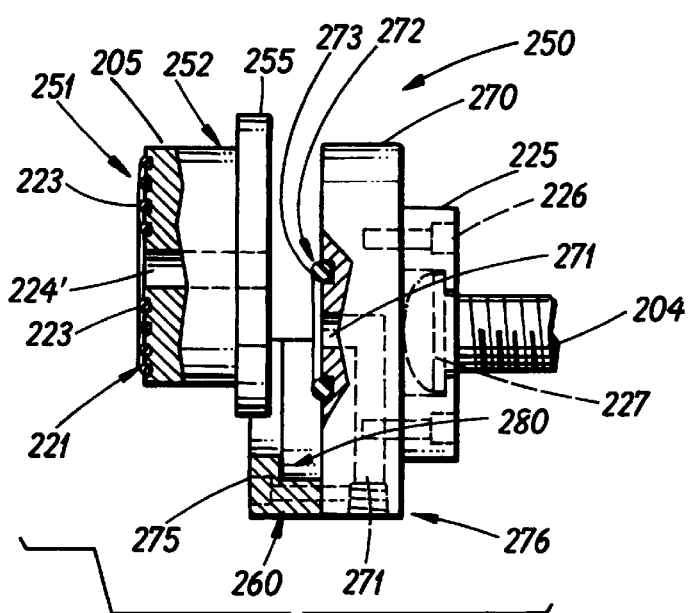
FIGS. 8–11 are partial cross-sectional views of seal heads in accordance with the present invention.
Figure 9:
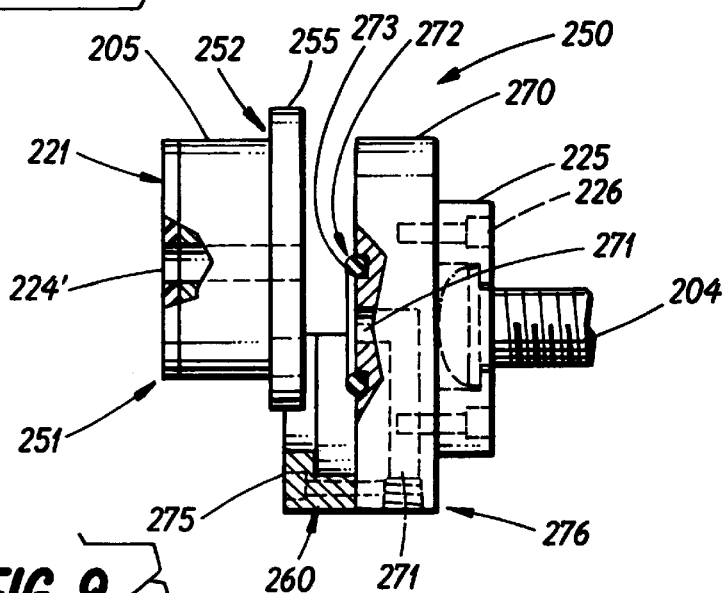
Figure 10:
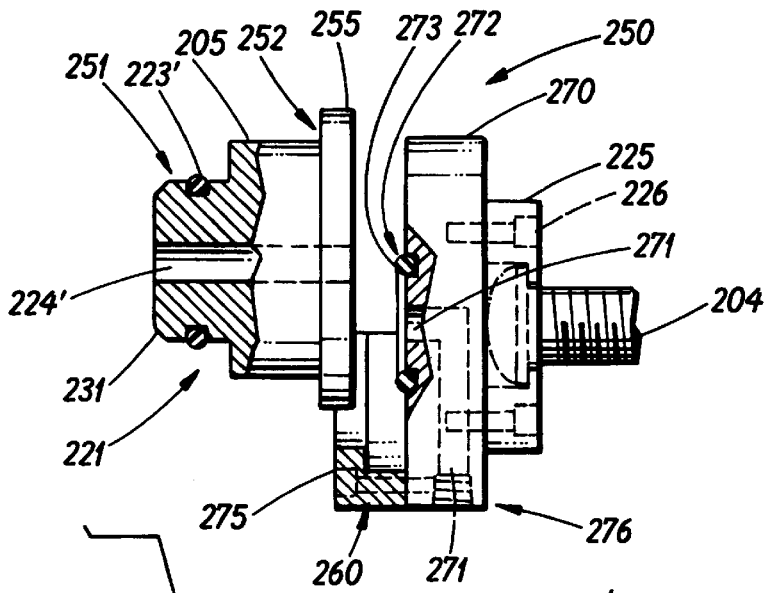
Figure 11:
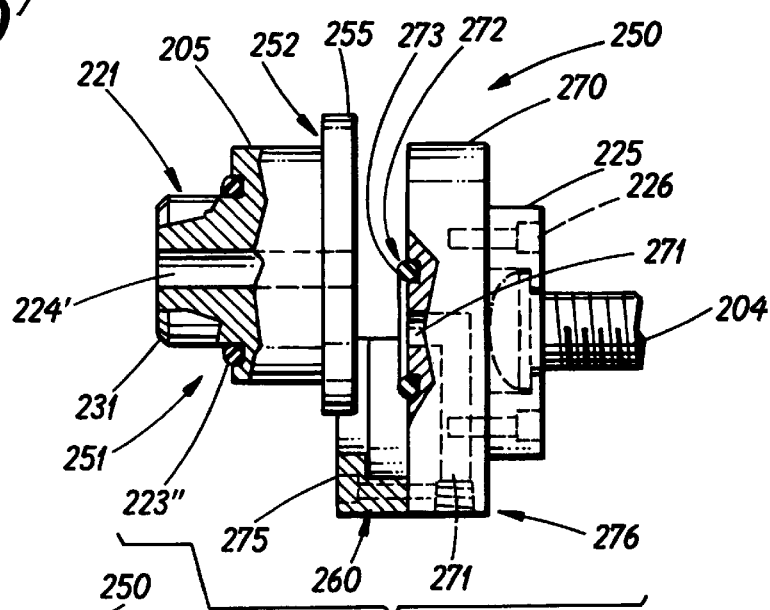

In FIGS. 5–7, other types of end configurations for valves 201 are illustrated. Valve 201 of FIG. 5 is illustrative of a female threaded end connection for valve 201, which is also similar to a male threaded end connection on valve 201. Seal head 220 of FIG. 5 is identical to that previously described and illustrated in connection with FIG. 4, with the exception that the sealing surface 221 of seal head 220 includes a layer of plastic material 230 disposed upon seal plate 222. The plastic material may preferably be a polyurethane sealing surface.

In FIG. 6, valve 201 has a buttwelded end configuration which is also illustrated in the valve 201 of FIG. 3. Seal head 220 of FIG. 6 is also identical to that previously described in connection with FIG. 4, with the exception that sealing surface 221 includes an annular plug 231 which is sealingly received within an opening 215 of valve 201 by use of an O-ring seal 223' which is disposed about the circumference of annular plug 231.

In FIG. 7, a socket-welded end configuration for valve 201 is illustrated. Once again, prior art seal head 220 is of identical construction to that previously illustrated in connection with FIG. 4, with the exception that sealing surface 221 includes an annular plug 231 which is sealingly received with an opening 215 of valve 201 by an O-ring seal 223" as shown in FIG. 7.

In each of the prior art seal heads 220 illustrated in FIGS. 4–7, it is necessary to remove the seal head 220 from the valve testing machine, and replace the removed seal head 220 with another seal head 220 each time a valve 201 having a different type of end configuration is to be tested. If the size of end configurations for valves 201 of FIGS. 4 and 5 are changed, the same seal head 220 may be utilized for different sized valves. If different sized end configurations for valves 201 of FIGS. 6 and 7 are to be tested, it is necessary to change the particular size of seal head 220 in order to test those types of valves. Each time a seal head 220 must be removed and a new seal head 220 installed, it is thus necessary to unbolt abutment member retainer member 225 from secondary seal plate 222a, as by loosening the plurality bolts 226, or alternatively, to unbolt, or unscrew, seal plate 222 from secondary seal plate 222a. As previously discussed, this is a time consuming, labor intensive task to be performed each time a different sized, or configured, valve 201 is to be pressure tested. Furthermore, it is typically necessary to change two seal heads 220 for each change of valve 201.

With reference to FIGS. 8–12, a number of seal heads 250, in accordance with the present invention, are illustrated. Each seal head 250 includes a seal plate 205 having first and second ends 251, 252 with a sealing surface 221 disposed on the first end 251 of each seal plate 205. Each of the sealing surfaces 221 illustrated in FIGS. 8–11 corresponds to the sealing surfaces 221 previously described in connection with FIGS. 4–7, and identical parts bear identical reference numerals, as previously described. On the second end 252 of each seal plate 205 is disposed a mounting plate 255. Preferably, seal plate 205 and its associated mounting plate 255 are fixedly secured to each other as by welding seal plate 205 to mounting plate 255, or by bolting mounting plate to seal plate 205 by a plurality of bolts (not shown). Sealing surface 221 of each seal plate 205 includes a fluid passageway 224', which is in fluid communication with the opening, or interior, 215 of valve 201 (FIG. 3), and fluid passageway 224' is preferably adapted for communication with a supply of pressurized fluid, as will be hereinafter described in greater detail. Preferably, fluid passageway 224' passes through the center of both seal plate 205 and its mounting plate 255.

Figure 12:
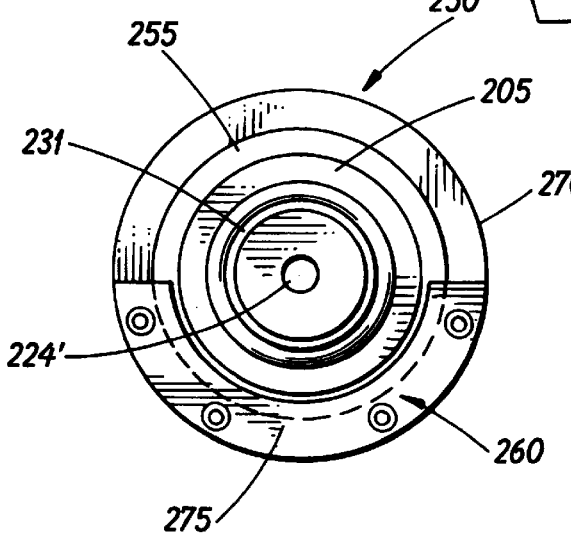
FIG. 12 is an end view of the seal head of FIG. 11, when a seal plate and mounting plate are received within a mounting plate cradle, in accordance with the present invention.

Still with reference to FIGS. 8–12, each seal head 250, in accordance with the present invention, includes a mounting plate cradle 260 for releaseably securing the mounting plate 255 to a cradle support plate 270. Cradle support plate 270 is in some respects similar in construction to secondary seal plate 222a illustrated in FIGS. 4–7, in that cradle support plate 270 is adapted to receive a force from the force transmitting member, or lead screw 204, by abutment member retainer member 225, as previously described in connection with FIGS. 4–7, and as illustrated and described in U. S. Pat. No. 4,813,456. Cradle support plate 270 is fixedly secured to abutment member retainer member 225 by a plurality of bolts 226 as previously described. By merely placing the mounting plate 255 with its associated seal plate 205 within mounting plate cradle 260, as shown in FIGS. 3 and 12, seal plate 205 may be readily installed within the valve testing machine 200 without the necessity of screwing or bolting the seal plate 205 within the valve testing machine 200.

The use of the term "releaseably securing" is used in this specification and the claims appended hereto to mean that the mounting plate 255 is secured to, or associated with, cradle support plate 270 to permit valves 201 to be pressure tested, without the necessity of securing seal plate 205 or mounting plate 255 to cradle support plate 270 by use of any element which must be screwed, bolted, or requires any similar type manual operation to enable seal plate 205 to be installed within valve testing machine 200 for pressure testing valve 201. It should be further noted that the use of the term "valve" in this specification and the claims appended hereto, is intended to encompass not only the valves 201 as illustrated in FIGS. 3–7, but is also intended to encompass other products, such as pipe, fittings, or other products which are desired to be pressure tested, and have at least one opening which must be sealed by a seal plate, before the interior of the product can be pressure tested.

Still with reference to FIGS. 8–11, cradle support plate 270 preferably includes a fluid passageway 271 which is in fluid communication with the fluid passageway 224' of the sealing surface 221 when the mounting plate 255 is releaseably secured to the cradle support plate 270 by the mounting plate cradle 260. A source of pressurized fluid, such as pressurized air or water, or similar fluid, may be connected to fluid passageway 271, as by fluid hose 207 (FIG. 3), to supply the desired pressurized fluid through fluid passageways 271 and 224' into the interior, or opening, 215 of valve 201. Alternatively, as illustrated in FIG. 3, the supply of pressurized fluid 206 may communicate directly with fluid passageway 224' of seal plate 205; however, it would then be necessary to disconnect, and reconnect pressurized fluid hose 207 to a new seal plate 205, each time a new seal plate 205 is utilized in valve testing machine 200. A sealing means 272 may be associated with the mounting plate 255 and the cradle support plate 270, whereby the sealing means 272 seals the fluid passageway 224' of the sealing surface 221 with respect to the fluid passageway 271 of the cradle sulpport plate 270. Preferably, the sealing means 272 is an O-ring seal 273 disposed upon cradle support plate 270. When a seal plate 205 and its associated mounting plate 255 are inserted within mounting plate cradle 260, mounting plate 255 abuts against cradle support plate 270 and sealing means 272 surrounds the juncture of fluid passageways 224' and 271.

As shown in FIGS. 8–12, mounting plate cradle 260 is preferably a lip member 275 which extends outwardly from the cradle support plate 270. Preferably, the cradle support plate 270 has a lower end 276 and the lip member 275 is disposed about the lower end 276 of the cradle support plate 270. As can be readily seen from FIGS. 8–12, the lip member 275 defines a receptacle 280 for receipt of at least a portion of the mounting plate 255. As seen in FIG. 12, the mounting plate 255, the cradle support plate 270, and the mounting plate cradle 260 each have a particular cross-sectional configuration, and the cross-sectional configuration of the mounting plate 255 generally conforms to the cross-sectional configuration of the mounting plate cradle 260. As illustrated in FIG. 12, the mounting plate 255 has a generally circular cross-sectional configuration and the mounting plate cradle 260, or lip member 275 has a generally semi-circular cross-sectional configuration. The mounting plate cradle 260, or lip member 275, is thus seen to closely conform to the lower portion of the outer cross-sectional configuration of mounting plate 255, whereby mounting plate 255 is releaseably secured to cradle support plate 270, as previously described.

With reference to FIGS. 13 and 14, a machined ring 280 is illustrated, after it has been cut in half at locations indicated by arrows 281. Each machined ring 280 may preferably be utilized as a mounting plate cradle 260, or lip member 275. As seen in FIGS. 13 and 14, ring 280 has an annular recess 282 formed therein, whereby the desired semi-circular shaped lip member 275 is formed. A plurality of openings 283 are provided for receipt of bolts (not shown) whereby mounting plate cradle 260 may be fixedly secured to cradle support plate 270 by the use of such bolts.

With reference to FIGS. 3 and 8–11, it can be seen that different types of valves 201 may be readily pressure tested by practicing the following steps. At least one seal plate 205 of at least one seal head 250 is releaseably secured within the valve testing machine 200, without screwing or bolting the seal plate 205 within the valve testing machine 200. The first seal plate 205 is preferably releaseably secured within the valve testing machine 200 as by use of the seal head 250 previously described in connection with FIGS. 8–12. A valve is 201 is then disposed in the valve testing machine 200, as illustrated in FIG. 3. By operation of the force transmitting member, or lead screw 204, in the manner previously described, at least one opening, or the interior, 215 of valve 201 may be sealed with a sealing surface 221 disposed on the seal plate 205, as previously described. The first valve may then be pressure tested by pumping pressurized fluid into the valve 201 into the at least one opening 215 into the interior of valve 201 as previously described. Preferably, both ends of valve 201 are sealed, as shown in FIG. 3; however, it should be noted that if valve 201 is closed, as by operation of handle 201' (FIG. 3), it might only be necessary to seal the upper opening 215 of valve 201 to pressure test valve 201.

Once valve 201 is pressure tested, lead screw 204 is backed off and another valve 201, requiring the same seal plate 205 of seal head 250 may be pressure tested in the manner previously described. When it is desired to pressure test a different type, or size of valve 201, which requires a different seal plate 205 of seal head 250, it is then necessary to merely lift out the previously utilized seal plate 205 and its associated mounting plate 255 from mounting plate cradle 260, and a second, or different seal plate 205 is releaseably secured within the valve testing machine 200 in the manner previously described. The opening 215 of the second type of valve 201 is then sealed as previously described, and the pressure testing of the second type of valve 201 is carried out. The second seal plate 205 of seal head 250 may have a different construction from the first seal plate 205 previously utilized, and may have any of the constructions illustrated in FIGS. 8–11. Additionally, the second seal plate 205 may have a different size from the seal plate previously used as previously discussed in connection with the seal plates 205 of FIGS. 10 and 11, wherein seal plates having the same general construction, but different sizes, might be utilized.

It is to be understood that the invention is not limited to the exact details of construction, operation, exact materials or embodiments shown and described, as obvious modifications and equivalents will be apparent to one skilled in the art; for example, a different type of sealing surface from those illustrated in FIGS. 8–11 might be utilized, dependent upon the construction of the valve, or other product to be pressure tested. Accordingly, the invention is therefore to be limited only by the scope of the appended claims.

I claim:

1. A seal head for sealing an opening of a valve to permit pressure testing of the valve by a valve testing machine having a force transmitting member adapted to force the seal head into sealing engagement with the opening of the valve, comprising:

a seal plate having first and second ends, with a sealing surface disposed on the first end for sealing the opening of the valve, and a mounting plate disposed on the second end, the sealing surface including a fluid passageway in communication with the opening of the valve and adapted for communication with a supply of pressurized fluid; and a mounting plate cradle for releaseably securing the mounting plate to a cradle support plate, the cradle support plate being adapted to receive a force from the force transmitting member, whereby the seal plate may be readily installed within the valve testing machine without the necessity of screwing, clamping, or bolting the seal plate within the valve testing machine.

2. The seal head of claim 1, wherein the cradle support plate includes a fluid passageway which is in fluid communication with the fluid passageway of the sealing surface when the mounting plate is releaseably secured to the cradle support plate by the mounting plate cradle.

3. The seal head of claim 2, wherein a sealing means is associated with the mounting plate and the cradle support plate and the sealing means seals the fluid passageway of the sealing surface with respect to the fluid passageway of the cradle support plate.

4. The seal head of claim 3, wherein the sealing means is an O-ring seal.

5. The seal head of claim 1, wherein the mounting plate cradle is a lip member extending outwardly from the cradle support plate.

6. The seal head of claim 5, wherein the cradle support plate has a lower end, and the lip member is disposed about the lower end of the cradle support plate, and the lip member defines a receptacle for receipt of at least a portion of the mounting plate.

7. The seal head of claim 6, wherein the mounting plate, the cradle support plate, and the mounting plate cradle each have a particular cross-sectional configuration, and the cross-sectional configuration of the mounting plate generally conforms to the cross-sectional configuration of the mounting plate cradle.

8. The seal head of claim 7, wherein the mounting plate has a generally circular cross-sectional configuration and the mounting plate cradle has a generally semicircular cross-sectional configuration.

9. The seal head of claim 1, wherein the sealing surface includes at least one O-ring seal disposed upon the seal plate.

10. The seal head of claim 1, wherein the sealing surface is a layer of a plastic material disposed upon the first end of the seal plate.

11. A valve testing machine for pressure testing of a valve having at least one opening, comprising:

a frame;

means for mounting the valve to be pressure tested within the frame;

at least one seal plate having first and second ends, with a sealing surface disposed on the first end for sealing the at least one opening of the valve, and a mounting plate disposed on the second end, the sealing surface including a fluid passageway in communication with the at least one opening of the valve, the fluid passageway being disposed in fluid communication with a supply of pressurized fluid;

a force transmitting member, associated with the frame for forcing the at least one seal plate into sealing engagement with the at least one opening of the valve; and a mounting plate cradle for releaseably securing the mounting plate of the at least one seal plate to a cradle support plate, the cradle support plate being operatively associated with the force transmitting member, whereby the at least one seal plate may be readily installed within the frame without the necessity of screwing, clamping, or bolting the at least one seal plate within the frame.

12. The valve testing machine of claim 10, wherein the cradle support plate includes a fluid passageway which is in fluid communication with the fluid passageway of the sealing surface when the mounting plate is releaseably secured to the cradle support plate by the mounting plate cradle.

13. The valve testing machine of claim 12, wherein a sealing means is associated with the mounting plate and the cradle support plate and the sealing means seals the fluid passageway of the sealing surface with respect to the fluid passageway of the cradle support plate.

14. The valve testing machine of claim 13, wherein the sealing means is an O-ring seal.

15. The valve testing machine of claim 11, wherein the mounting plate cradle is a lip member extending outwardly from the cradle support plate.

16. The valve testing machine of claim 15, wherein the cradle support plate has a lower end, and the lip member is disposed about the lower end of the cradle support plate, and the lip member defines a receptacle for receipt of at least a portion of the mounting plate.

17. The valve testing machine of claim 16, wherein the mounting plate, the cradle support plate, and the mounting plate cradle each have a particular cross-sectional configuration, and the cross-sectional configuration of the mounting plate generally conforms to the cross-sectional configuration of the mounting plate cradle.

18. The valve testing machine of claim 17, wherein the mounting plate has a generally circular cross-sectional configuration and the mounting plate cradle has a generally semi-circular cross-sectional configuration.

19. The valve testing machine of claim 10, wherein the sealing surface includes at least one O-ring seal disposed upon the seal plate.

20. The valve testing machine of claim 10, wherein the sealing surface is a layer of a plastic material disposed upon the first end of the seal plate.

* * * * *